Nov. 12, 1963     E. L. LITTLE, JR     3,110,590
COMPOSITIONS OF MOLYBDENUM, NITROGEN AND SILICON
AND SHAPED OBJECTS THEREFROM
Filed Oct. 6, 1961
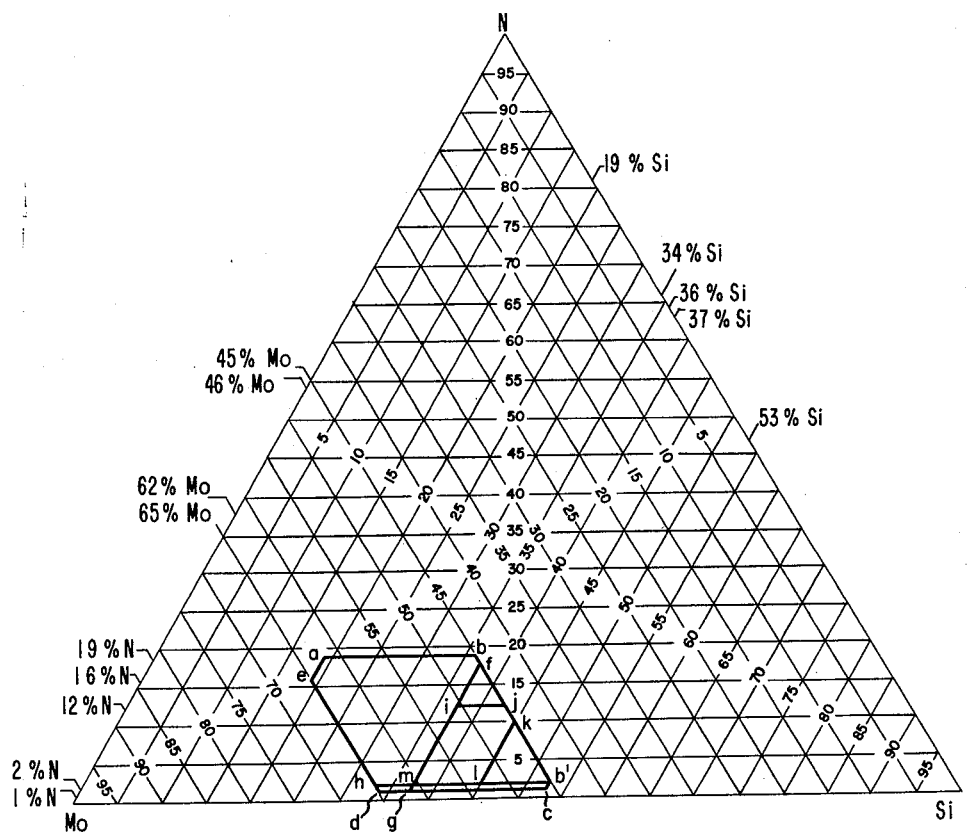
INVENTOR
ERNEST LEWIS LITTLE JR.
BY
AGENT United States Patent Office 3,110,590
Patented Nov. 12, 1963

3,110,590
COMPOSITIONS OF MOLYBDENUM, NITROGEN AND SILICON AND SHAPED OBJECTS THEREFROM
Ernest Lewis Little, Jr., Wilmington, Del., assignor to E. I. du Pont de Nemours and Company, Wilmington, Del., a corporation of Delaware
Filed Oct. 6, 1961, Ser. No. 143,321
8 Claims. (Cl. 75—176)

This invention relates to novel compositions of matter containing molybdenum, nitrogen, and silicon; to articles of manufacture (i.e., shaped objects) prepared therefrom which are hard, strong, creep-resistant, and resistant to oxidation even at high temperatures; and to methods for preparing such articles.

This application is a continuation-in-part of application S.N. 793,922, filed February 7, 1959, now abandoned.

Much effort has been expended in search of materials that are resistant to degradation at elevated temperatures. Although many silicides, such as molybdenum disilicide, possess good oxidation resistance at high temperature, these silicides are extremely brittle, creep rapidly under load at 1400–1500° C. and are therefore unsuitable for use as structural materials. Moreover, many complex alloys based on molybdenum disilicide containing three, four or even more components share this undesirable property of brittleness and are of little utility as structural materials. Modified molybdenum-silicon alloys have been described, for example, in Austrian Patent No. 181,431, which refers to molybdenum-silicon alloys containing up to 45% of one or more of the high melting transition metals of the 4th, 5th and 6th groups of the periodic system, such as titanium, zirconium, vanadium, niobium, and tungsten. These transition metals may be completely or partially replaced by their compounds such as nitrides, borides, silicides and oxides. However, in this very general description of molybdenum-silicon alloys with elements comprising a substantial fraction of the periodic table, no molybdenum-silicon-nitrogen composition is described nor are any materials primarily useful in structural applications disclosed.

It is an object of this invention to provide novel compositions of matter containing molybdenum, nitrogen, and silicon, including untreated, fired, hot-pressed and melt-cast compositions of these elements. Another object of the invention is to provide articles or shaped objects prepared either by firing, hot-pressing or melt-casting shaped but otherwise untreated compositions, or by machining or otherwise shaping previously fired, hot-pressed or melt-cast compositions. A still further object is to provide novel methods for preparing the aforesaid fired, hot-pressed or melt-cast compositions and articles. The primary object of the invention is to furnish structural materials containing molybdenum, nitrogen, and silicon in certain proportions which endow such structural materials with heretofore unobtainable combinations of properties at elevated temperatures.

These and other objects of this invention are accomplished by providing an untreated composition of matter, i.e., a composition that has not been fired, hot-pressed, or melt-cast, in which molybdenum, nitrogen, and silicon are present (on the basis of elemental analysis) in the proportions (by weight) of 45–65% Mo, 1–19% N, 19–53% Si. There is also included as a part of this invention fired, hot-pressed and melt-cast shaped objects and compositions (hereinafter sometimes referred to as converted compositions or objects) containing molybdenum, nitrogen and silicon in the proportions (by weight) of 45–65% Mo, 1–19% N, and 19–53% Si. The converted compositions and objects are resistant to oxidation, impact, and abrasion even at temperatures exceeding 1000° C. They are prepared by pressing the above untreated compositions into the form of the desired object and then heating to a temperature of at least 900° C. (firing), by hot-pressing at a temperature of at least 900° C. under a pressure of at least 1000 lb./sq. in., or by melting and casting.

Element(s) or compound(s), in addition to molybdenum, nitrogen and silicon, may be present in the untreated compositions and thus in the converted compositions and objects, provided they do not have a substantial adverse effect upon one or more of the properties: excellent impact strength and oxidation resistance as well as good creep resistance, good transverse rupture strength and high hardness at elevated temperatures, or upon the inherent properties of the molybdenum-silicon-nitrogen system at whatever temperature the converted compositions and objects are to be utilized. Various impurities (i.e., elements other than molybdenum, nitrogen, and silicon) which are present in minor amounts in the commercially available starting materials can be tolerated, as can added amounts of other element(s) and compound(s) which will not affect one or more of the desired properties to a degree sufficient to make the converted compositions undesirable as structural materials. There may be added such amounts of element(s) and/or compound(s) which will impart to the compositions, in an anticipated manner, various properties that are desirable for special applications without substantially affecting their inherent attributes as structural materials.

The converted compositions and shaped objects of the invention are particularly well suited for proplonged use at temperatures above 1000° C. Thus, preferred converted products of the invention may be described as fired, hot-pressed, and melt-cast compositions and objects, which contain molybdenum, nitrogen, and silicon in proportions referred to above and which have excellent impact strength and oxidation resistance as well as good creep resistance, high hardness, and good transverse rupture strength at temperatures above 1000° C., i.e., converted compositions and objects which are not adulterated with impurities having a consequential adverse effect upon such properties at a temperature above 1000° C.

It is to be understood that minor changes in the relative proportions of the essential elements will occur when the untreated compositions are converted to fired or melt-cast compositions or objects due to the elimination of expendable impurities in the starting materials as well as the loss of inconsequential amounts of nitrogen. However, for simplicity of expression and ease of understanding, the proportions of essential elements in the untreated compositions and in the product compositions and objects are hereafter referred to in terms of the same numerical values.

The compositions of this invention are illustrated by the area of the hexagon abb'cde appearing on the attached triangular graph. The triangular graph represents all combinations of molybdenum, nitrogen and silicon. The apexes of the hexagon are as follows:

a—62% Mo, 19% N, 19% Si
b—45% Mo, 19% N, 36% Si
b'—45% Mo, 2% N, 53% Si
c—46% Mo, 1% N, 53% Si
d—65% Mo, 1% N, 34% Si
e—65% Mo, 16% N, 19% Si

The converted objects of this invention possess high impact strength and oxidation-resistance coupled with high hardness and good transverse rupture strength at elevated temperatures. By virtue of these properties, the converted materials are excellent for use in fabrication of cutting tools, heating elements and in structural elements used at high temperatures such as turbine buckets and other parts of propulsion engines.

Although, as indicated above, all converted objects within the broad composition ranges of this invention possess desirable and useful properties, it will be appreciated that certain compositions are superior to others with respect to particular properties and therefore are preferred in applications requiring these properties in high degree. For example, increasing the silicon content improves oxidation resistance of the product. However, converted objects containing less than 37% silicon (line *fg* on the graph) generally exhibit higher transverse rupture strength at elevated temperatures than compositions containing larger percentages of silicon, but at the same time retain superior oxidation resistance. Such converted objects are represented by the area *abfgde* on the graph. Also, transverse rupture strength and oxidation resistance are influenced by the nitrogen content of the converted object. For high transverse rupture strength, a nitrogen content of at least 2% (line *hb'* on the graph) is desirable, while a nitrogen content of at least 10% is preferred in compositions containing 60% or more molybdenum for greatest high temperature oxidation resistance. For high impact strength, compositions which contain small proportions of an alkaline material, as described in greater detail below, are preferred. Converted objects containing molybdenum, nitrogen and silicon in the proportions 45–61% Mo, 2–12% N, and 37–45% Si (pentagon *ijklm* on the graph) exhibit excellent abrasion resistance, i.e., exceptional hardness, especially when modified with alkaline material. When transverse rupture strength and impact strength are of lesser importance, converted compositions and objects defined by triangle *b'lk* on the graph are highly useful because of their exceptional oxidation resistance and high hardness at temperatures above 1000° C.

Examination of converted products of this invention by metallographic techniques shows the presence of at least two phases. This is confirmed by X-ray examination. One of the phases is a molybdenum silicide matrix which may be one or more of $MoSi_2$, $Mo_5Si_3$ (tetragonal and hexagonal), and $Mo_3Si$. Dispersed within the molybdenum silicide matrix is an α- and/or β-$Si_3N_4$ phase, and in some instances, a solid solution of nitrogen and/or a ternary Mo—Si—N phase is present. In such objects the X-ray pattern of the phase does not correspond with that of molybdenum, silicon, or gamma-molybdenum nitride ($Mo_2N$).

The phases occur as very small and uniform grains averaging 2–4 microns across. Porosity is low and the pores extremely small. Examination of cracks intentionally introduced into a sample shows that all failure is transcrystalline and that there is no preferred path of cracking, and it also indicates that propagation of cracks is difficult. In contrast, metallographic examination of a specimen of molybdenum disilicide prepared similarly showed the presence of large grains (average dimension about 7 microns with some grains ranging up to 30 microns) and of large pores.

In preparing the compositions of this invention, the elements themselves or compounds and alloys thereof can be employed. For example, the compositions can be prepared by heating together molybdenum, silicon, and silicon nitride in such proportions that the final composition falls within the ranges cited above. Alternatively, all or part of the molybdenum may be introduced in the form of a molybdenum-silicon alloy. Nitrogen is preferably incorporated in the powder metallurgy composition in combination with silicon, since nitrogen in this form is easily handled and produces alloys having excellent properties. It is also possible to incorporate nitrogen by heating in an atmosphere of nitrogen, especially by application of superatmospheric pressure.

When fabrication is to be carried out by pressing and heating, or by hot-pressing, the untreated composition is preferably in the form of a fine powder having substantially all particles less than 75 microns in size, and which should be thoroughly mixed to insure homogeneity. Particularly useful compositions are obtained by grinding together silicon nitride, molybdenum disilicide, silicon and molybdenum in such proportions that the resulting powder falls within the ranges of composition and particle size mentioned above.

The above compositions are readily shaped, for example, by cold-pressing or by slip-casting techniques, and then converted by firing at a temperature of at least 900° C., preferably 1300–1850° C. or above. Such objects are also obtained by hot-pressing the powders at a pressure of at least 1000 p.s.i. and a temperature of 900° C. or above. It is preferred that hot-pressing be carried out at 1300–1700° C. under 2000–5000 p.s.i. pressure.

When converted objects are prepared by melt-casting, the particle size of the constituent materials is not critical and relatively massive forms such as lumps can be employed. A temperature sufficient to bring the entire charge to a molten condition must, of course, be employed. Generally, this temperature will be at least 2000° C.

Whatever the method of conversion, the time of heating must be sufficient to insure complete conversion. Times of 30 seconds to 30 minutes usually suffice although longer periods may be employed if desired without detrimental effect. It is sometimes desirable to carry out a preliminary firing of the powder composition under the conditions described above, and then to grind the fired material to fine particle size and again fire in the form of the final object. This procedure results in objects having superior high temperature properties.

The powder composition may be converted by compressing and firing in the dry state. However, it is often helpful to moisten the powder with a liquid, e.g., water, to assist in forming it into the desired shape. Dilute alkaline solutions are particularly desirable for this purpose because the small amount of alkaline material remaining in the composition after drying leads to the formation of converted objects having much improved properties as described in greater detail below. Before heat treatment, any water or other volatile liquid present in the compacted powder should be reduced to less than about 3% (by weight of the powder) to prevent rupture of the object during firing. Preferably, the volatile liquid is one that will be completely vaporized at a temperature less than about 350° C., e.g., water, alcohol or kerosene.

Depending on the properties desired in the converted product, it is sometimes preferred to incorporate a small amount of alkali metal or alkaline earth metal in the untreated composition before it is converted by heat treatment. This procedure is particularly beneficial when fired or hot-pressed compositions and objects having higher impact strengths and improved oxidation resistance are desired. Thus, by incorporating an alkali or alkaline earth metal in the composition before conversion, a significant and unexpected change in properties is obtained, and this change assumes considerable importance for special high temperature applications where excellent impact strength is the objective. This process and the converted compositions and objects provided thereby constitute preferred embodiments of the invention.

The manner in which the alkaline earth metal or alkali metal is introduced into the composition is not critical. Thus, these metal(s) may be introduced in the dry state either as elements or compounds, or in liquid form as dispersions or solutions. When compounds are used, the alkali or alkaline earth metal is preferably introduced as a compound of one of the elements of the composition, e.g., sodium or lithium molybdate, or a compound which will thermally decompose at conversion temperature leaving an oxide or hydroxide residue, e.g., calcium carbonate, lithium acetate, etc. Solutions and dispersions of the elements or compounds are conveniently employed because they readily permit uniform blending with the powder compositions. Of course, the carrier liquid must be volatile and also inert with respect to the components of the composition.

Preferably, an aqueous alkaline solution of an alkali or an alkaline earth metal oxide or hydroxide, e.g., sodium hydroxide, lithium hydroxide, barium hydroxide, or calcium hydroxide, or a compound convertible thereto by heat such as a carbonate or bicarbonate, is employed. Although in certain cases potassium compounds can be used, these ordinarily are not as effective as compounds of sodium or lithium. Sodium compounds are particularly effective. When sodium hydroxide is employed, an oxidation resistant layer of $Na_2MoO_4$ (sodium molybdate) forms on the surface of the object during sintering. When other of the above metal compounds are employed, the corresponding molybdate forms in a similar manner providing an oxidation resistant coating.

The concentration of the alkaline compound in the aqueous solution will usually be in the range of 1–5% by weight although higher concentrations up to the solubility limit of the compound can be employed if desired. The concentration chosen depends upon the quantity of alkali or alkaline earth metal desired in the powder after drying. This latter proportion is usually in the range of 0.20–5.0% by weight of the powder compositions, irrespective of the form in which the alkali metal or alkaline earth metal is introduced. However, proportions up to 10% (by weight) can be employed. Objects and compositions prepared from powders treated with an alkaline compound contain up to 10%, generally 0.20–5.0% of alkali or alkaline earth metal.

The use of an alkaline compound or metal as described above results in the formation of converted objects having high impact strength. Usually such objects also are more dense than those prepared without such additives; however, transverse rupture strength is often lower.

The invention is illustrated in greater detail by the examples which follow. In these examples, the starting materials employed were of ordinary commercial purity. Transverse rupture strength was measured using a specimen nominally ¼" x ¼" in cross-section supported symmetrically on parallel ceramic rods ⅛" in diameter and 1" apart. Force was applied at the center of the portion of the bar between the supports by the edge (radius ¹⁄₁₆") of a V-shaped member.

Impact strength was measured by a modification of ASTM Method E2347T using unnotched specimens 1" x ¼" x ¼" in nominal dimensions. These specimens usually were prepared from pieces resulting from previous transverse rupture tests. In impact testing, half the length of the specimen was unsupported and the point of impact was 0.3" from the support. A 25 inch-pound hammer was usually employed.

EXAMPLE I

A mixture of 126 g. of molybdenum powder and 110 g. of silicon nitride, $Si_3N_4$ (composition of mixture 53.4% Mo, 18.6% N, 28.0% Si), were placed in a 1-qt. porcelain ball mill to which was added 250 ml. of benzene and 700–800 g. of quartz pebbles. The mixture was milled for 72 hours after which time the contents of the mill were removed, the benzene allowed to evaporate, and the powder mixture separated from the pebbles by sieving through a 200-mesh screen.

A portion of the powder mixture was hot-pressed in a graphite mold at 1600–1700° C. under a pressure of 3000 lb./sq. in. to yield a hard, metallic bar. This bar exhibited a bulk density of 4.08 g./cc. (measured by dividing weight of bar by volume calculated from its dimensions) and had a transverse rupture strength at 25° C. of 28,050 lb./sq. in. The impact strength was 16.1 ft. lb./sq. in. and the Knoop Hardness at 100 g. load was 462.

EXAMPLE II

A mixture of 50 g. of molybdenum powder, 100 g. of molybdenum disilicide and 44 g. of silicon nitride containing the elements in the proportion 58.2% Mo, 9.0% N, and 32.8% Si was used to prepare a powder composition as described in Example I. A portion of the composition was mixed with 5% aqueous sodium hydroxide using 15 g. of sodium hydroxide solution for 50 g. of dry powder. The resulting paste was spread out on an evaporating dish and allowed to dry overnight at room temperature. The cake so obtained was further dried by heating in a vacuum oven at 115° C. for 1 hour, after which it was ground in a porcelain mortar and put through a 200-mesh screen.

Bars were prepared from this sodium hydroxide-treated powder and from powder not so treated by hot-pressing as in Example I.

The physical properties of the bars were as follows:

| Property | Hot-Pressed Pressed Bar | Alkali-Treated and Hot-Pressed Bar |
|---|---|---|
| Bulk Density (g./cc.) | 4.32 | 4.96 |
| Trensverse rupture strength (p.s.i.): | | |
| at 25° C | 40,376 | 48,444 |
| at 1,250° C | 39,972 | 41,860 |
| at 1,350° C | (not measured) | 21,148 |
| Impact strength (ft. lb./sq. in.) | 12.53 | 30.56 |
| Knoop Hardness No.: | | |
| 10 g. load | 2228 | 2013 |
| 100 g. load | 1201 | 1424 |
| 1,000 g. load | 930 | 1021 |

EXAMPLE III

A powder was prepared as described in Example I from a mixture of 96 g. of molybdenum, 54 g. of molybdenum disilicide and 50 g. of silicon nitride. This composition contained molybdenum, nitrogen and silicon in the proportions 65% Mo, 10% N, and 25% Si. Test bars were fabricated by hot-pressing after prior treatment with sodium hydroxide as described above. These bars had the following properties:

Bulk density (g./cc.) _____ 5.41
Transverse rupture strength (p.s.i.):
  At 25° C _____ 31,590
  At 1250° C _____ 26,069
  At 1350° C _____ 16,690
Impact strength (ft. lb./sq. in.) _____ 25.0

The converted material was analyzed for Mo, N, Si and O with the following results: Mo, 60.8; N, 6.62; Si, 24.94; O, 3.00. The converted material contained 0.2–1.0% Na, by emission spectroscopy, and X-ray examination of a powdered sample showed the presence of $Mo_5Si_3$ (tetragonal and hexagonal), α- and β-$Si_3N_4$ and $Mo_3Si$.

Analysis of $Si_3N_4$ employed in the unconverted composition gave the following results: Found: N, 35.96; Si, 56.21; O, 2.65; other metals (by difference), 5.18. Theoretical composition of $Si_3N_4$:N, 39.94; Si, 60.06. X-ray examination of this material showed α- and β-$Si_3N_4$ and α-$SiO_2$.

EXAMPLE IV

A powder containing 45% Mo, 10% N and 45% Si was prepared, using 143 g. of molybdenum disilicide, 7 g. of silicon and 50 g. of silicon nitride as starting materials, according to the procedure of Example I. Test bars were prepared from this composition by hot-pressing after prior treatment with sodium hydroxide and without such treatment. These bars had the following properties:

| Property | Sodium Hydoxide Treated | Untreated |
| --- | --- | --- |
| Bulk density (g./cc.) | 4.28 | 3.76 |
| Transverse rupture strength (p.s.i.): | | |
| at 25° C | 37,703 | 68,664 |
| at 1,250° C | 31,152 | 24,339 |
| at 1,350° C | 25,565 | (not measured) |
| Impact strength (ft. lb./sq. in.) | 22.2 | 14.7 |
| Knoop Hardness No.: | | |
| at 10 g. load | (Not measured) | 1807 |
| at 100 g. load | 1771 | 927 |
| at 1,000 g. load | 1213 | 770 |

The converted products prepared from powder treated with sodium hydroxide contained 0.2–1.0% Na, by emission spectroscopy. Tests run only on the sodium hydroxide-treated specimens revealed that they had superior scratch and abrasion resistance.

EXAMPLE V

A powder containing 61% Mo, 2% N and 37% Si was prepared from 184 g. of molybdenum disilicide, 6 g. of molybdenum and 10 g. of silicon nitride according to the procedure of Example I. Test bars were prepared from this composition by hot-pressing after treatment with sodium hydroxide solution. These test bars had the following properties:

Bulk density (g./cc.) _____ 5.13
Knoop Hardness No. at 300 g. load _____ 1129
Transverse rupture strength (p.s.i.):
  At 25° C _____ 39,614
  At 1250° C _____ 13,371
Impact strength (ft. lb./sq. in.) _____ 27.3

The converted material was analyzed with the following results: Mo, 54.55; N, 1.83; Si, 34.83; O, 4.27. X-ray examination of converted material in powder form showed the presence of $Mo_5Si_3$ (tetragonal and hexagonal) and $MoSi_2$.

A shaped object of the product of Example V was satisfactorily used as a cutting tool on a well-known difficultly-machinable alloy of nickel, molybdenum, chromium, iron and tungsten.

EXAMPLE VI

A powder composition was prepared as described in Example I from a mixture of 175 g. of molybdenum disilicide and 25 g. of silicon nitride. This composition contained molybdenum, nitrogen and silicon in the proportions 55.2% Mo, 5.0% N, and 39.8% Si. Test bars were prepared by hot-pressing after treatment with sodium hydroxide as described above. These bars had the following properties:

Bulk density (g./cc.) _____ 4.90
Transverse rupture strength (p.s.i.):
  At 25° C _____ 33,134
  At 1250° C _____ 28,078
Impact strength (ft. lb./sq. in.) _____ 24.0

Analysis by emission spectroscopy showed the presence of 0.2–1.0% Na. These bars also had excellent scratch and abrasion resistance.

Knoop Hardness No.:
  10 g. load _____ 2524
  100 g. load _____ 1558
  1000 g. load _____ 1196

EXAMPLE VII

A mixture of molybdenum powder, molybdenum disilicide and silicon nitride containing the elements in the proportions 58.2% Mo, 9.0% N, and 32.8% Si was placed in a boron nitride combustion boat which was then inserted in a graphite combustion tube. Air was swept from the tube with nitrogen and a slow stream of nitrogen was passed through the tube over the powder mixture while tube and contents were heated and again cooled to room temperature. The apparatus was so arranged that the contents of the combustion boat could be observed during heat treatment. Melting of the powder was observed at about 2055° C. (temperature was measured with a radiation pyrometer). Heating was continued for 15 minutes thereafter, a maximum temperature of 2100° C. being attained. The melt, after cooling to room temperature, was a hard button having a silvery luster and the following properties:

Immersion density (in toluene) (g./cc.) _____ 6.27
Knoop Hardness No.:
  100 g. load _____ 1230
  1000 g. load _____ 901

Although the new products of this invention are composed principally of molybdenum, nitrogen, and silicon, there can be present other elements(s) or compound(s) that do not have a materially adverse effect upon the basic and novel characteristics of the converted compositions. Preferably molybdenum, nitrogen and silicon constitute at least 90% of the untreated compositions and converted products. Compositions containing at least 95% of these elements are particularly preferred because of the superior quality of the converted compositions and shaped objects obtained therefrom. Inconsequential amounts of impurities such as iron, aluminum, copper, manganese, carbon, and chromium are usually found in minor amounts in the starting materials employed. It is generally preferred that the compositions contain as little as possible of such impurities. Metal oxides from erosion of porcelain ball mills used in the preparation of powder compositions may also be present. Of course, as described above, the compositons will often contain such desirable additives as alkali or alkaline earth metals or compounds thereof.

Elemental molybdenum and silicon are not present in the converted objects of this invention to any appreciable extent in spite of the fact that these elements may constitute a considerable part of the composition before firing, hot-pressing, or melt-casting. The absence of these materials in elemental form is highly desirable since molybdenum is not resistant to high temperature oxidation and elemental silicon is brittle.

As illustrated by the following Example A, compositions which do not fall within the percentage ranges for molybdenum, nitrogen and silicon stated above, yield converted objects having inferior properties.

EXAMPLE A

A mixture of 158 g. of molybdenum, 7 g. of silicon, and 38 g. of silicon nitride containing the elements in the proportions 77.8% Mo, 7.5% N and 14.7% Si was converted to a powder as described in Example I. This powder was employed as such and after treatment with sodium hydroxide as described in Example II in fabrication of converted specimens for physical testing.

Satisfactory converted specimens could not be obtained from powder which had not been treated with sodium hydroxide due to breakage during hot-pressing. Specimens prepared from sodium hydroxide-treated powder exhibited an impact strength of only 3.2 ft. lb./sq. in. These specimens contained 0.2–1.0% Na by emission spectroscopy. Furthermore, these specimens were inferior to those of Example VI for scratch and abrasion resistance by factors of about 3 and 5, respectively.

(Identical tests for scratch and abrasion resistance were run on the specimens of Examples VI and A.)

Converted objects of this invention, particularly when porous, may undergo superficial oxidation on prolonged heating at high temperature. However, this oxidation is not extensive and does not materially weaken the structure. In such products complex oxides of molybdenum and silicon may be present in minor amount.

The converted objects of this invention are very resistant to high temperature oxidation as indicated by the small changes in weight and linear dimension which occur during exposure to elevated temperatures in air. This is illustrated by the data summarized in Table I below. Before measurement, the sample were cooled to room temperature after each stage of heating.

Table I

| After 16 hours successively at— | Change[1] in Converted Object | | | | | | | |
|---|---|---|---|---|---|---|---|---|
| | Example I | | Example II | | Example IV | | Example VI | |
| | Wgt. percent | Dimen. percent | Wgt. percent | Dimen. percent | Wgt. percent | Dimen. percent | Wgt. percent | Dimen. percent |
| 900° C | 0.68 | 0.71 | −0.43 | 0.72 | 0.22 | 2.40 | −0.05 | 1.81 |
| 1,000° C | 0.19 | 0.68 | −0.65 | 0.52 | 0.58 | 2.72 | −0.01 | 1.58 |
| 1,100° C | −0.45 | 0.64 | −0.78 | 0.62 | −0.73 | 2.01 | −0.84 | 1.27 |
| 1,200° C | −0.56 | 0.52 | −0.71 | 0.55 | −0.81 | 1.95 | −0.91 | 1.36 |
| 1,300° C | −0.74 | 0.48 | −0.76 | 0.52 | −0.84 | 1.65 | −0.93 | 1.33 |
| 1,400° C | −0.82 | 0.91 | −0.84 | 0.68 | −0.86 | 1.76 | −0.96 | 1.78 |
| 1,500° C | −0.43 | 5.46 | −0.83 | 1.94 | −0.93 | 2.50 | −0.92 | 4.51 |

[1] Percentage change in weight (Wgt.) and dimensions (Dimen.) based on original weight and dimensions after heating at the temperature indicated. The value shown for change in dimensions is the average of the percentage change in length, breadth, and thickness.

Preferably, when powdered compositions are used, they are obtained by milling or dry grinding by conventional methods until the mixture is homogeneous and the desired particle size is achieved. The progress of particle size reduction can be followed by the usual microscopic techniques. Although the powder compositions may contain up to 5% by weight of particles coarser than 75 microns and products satisfactory for some purposes can be prepared therefrom, it is preferred that less than 2% of such coarse particles be present. It is still better to screen out all coarse grains since they serve as points of chemical and mechanical inhomogeneity. Commercial powdered forms of molybdenum, molybdenum disilicide, silicon and silicon nitride, which are available with primary particle sizes less than 5 microns, are suitable for use in preparing the compositions of this invention.

It is preferred that the final converted shaped objects be at least 1 mm. in minimum dimension since thin objects are not only difficult to obtain but if obtainable have low structural strength, and when shaped prior to firing, are more subject to oxidation during firing than thicker objects. Of course, as indicated above, it is sometimes desirable to convert the powder composition, grind the converted composition and produce the final object by refiring the ground converted powder. When this is done, it may be desirable for ease in grinding that the thickness of the intermediate converted object, e.g., a wafer, be less than 1 mm.

In the examples, conversion of powdered compositions by hot-pressing has been described. It is also possible to convert the powder by sintering after cold-pressing the composition into the desired form. To obtain optimum properties in the converted object, it is preferred that the heating, if carried out in air, be rapid. However, if water or another volatile liquid has been employed in preparing the powder for firing, the initial rate of heating, i.e., up to about 350° C. must be slow to permit drying without cracking. After a temperature of about 350° C. is reached, heating to the conversion temperature should be as rapid as possible since slow heating in this range brings about powdering, expansion and cracking of the object.

A particularly important characteristic of the converted objects of this invention is inherent lubricity at elevated temperatures. This property, coupled with excellent high temperature properties, renders the converted products outstanding as materials of construction for extrusion die nibs. High inherent lubricity appears to be augmented by the presence of metal oxides introduced as hereinbefore described. Use of an alkali metal compound during shaping of the powder composition also appears to improve lubricity.

Ease of fabrication is a particular advantage of these new compositions of this invention. The high strength of shaped objects/after conversion and their resistance to elevated temperatures give them utility as structural components of high temperature furnaces and heat engines. Because of their hardness, the converted objects are also useful in the preparation of tools for cutting and sharpening operations and may be prepared in the form of grit for use in bonded abrasive wheels and brazed grit surfaces on metal sheets. In such uses, the products are comparable or superior to common abrasives such as silicon carbide.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition of matter for the preparation of hard, strong, creep-resistant and oxidation resistant articles of manufacture which consists essentially of, by elemental analysis, molybdenum, nitrogen and silicon in the proportions, by weight, of 45–65% molybdenum, 1–19% nitrogen and 19–53% silicon, nitrogen being present in the composition as a nitride.

2. A composition of claim 1 containing up to 10% by weight, of at least one member selected from the group consisting of an alkali metal and an alkaline earth metal.

3. A composition of matter having the properties: excellent impact strength and oxidation resistance as well as good creep resistance, high hardness and good transverse rupture strength at elevated temperatures, consisting essentially of, by elemental analysis, molybdenum, nitrogen, and silicon in the proportions, by weight, of 45–65% molybdenum, 1–19% nitrogen, and 19–53% silicon and, by phase analysis, a matrix of at least one molybdenum silicide having silicon nitride dispersed therein.

4. A composition of matter of claim 3 wherein molybdenum, nitrogen and silicon constitute at least 90% of the composition by weight.

5. A hard, strong, creep-resistant and oxidation-resistant article of manufacture which consists essentially of, by elemental analysis, molybdenum, nitrogen and silicon in the proportions, by weight, 45–65% molybdenum, 1–19% nitrogen and 19–53% silicon and, by phase analysis, a matrix of at least one molybdenum silicide having silicon nitride dispersed therein.

6. An article of manufacture of claim 5 wherein molybdenum, nitrogen and silicon are present in the proportions, by weight, of 45–65% molybdenum, 1–19% nitrogen, and at least 19% but less than 37% silicon.

7. An article of manufacture of claim 5 wherein molybdenum, nitrogen and silicon are present in the proportions, by weight, of 45–53% molybdenum, 2–10% nitrogen, and 45–53% silicon.

8. An article of manufacture of claim 5 wherein molybdenum, nitrogen, and silicon are present in the proportions, by weight, of 45–61% molybdenum, 2–12% nitrogen, and 37–45% silicon.

References Cited in the file of this patent

UNITED STATES PATENTS

| | | |
|---|---|---|
| 1,054,901 | Bosch et al. | Mar. 4, 1913 |
| 1,101,424 | Frank et al. | June 23, 1914 |
| 1,996,220 | Tigerschiold et al. | Apr. 2, 1935 |
| 2,116,400 | Marth | May 3, 1938 |
| 2,427,647 | Alexander | Apr. 19, 1949 |
| 2,854,736 | Taylor | Oct. 7, 1958 |

FOREIGN PATENTS

| | | |
|---|---|---|
| 181,431 | Austria | Mar. 25, 1955 |